US012797899B2

(12) United States Patent
Hüllenkremer et al.

(10) Patent No.: US 12,797,899 B2
(45) Date of Patent: Nov. 17, 2026

(54) PANELS COMPRISING A STRUCTURED LACQUER SURFACE

(71) Applicant: Akzenta Paneele + Profile GMBH, Kaisersesch (DE)

(72) Inventors: Felix Hüllenkremer, Koblenz (DE); Egon Hoff, Mastershausen (DE); Carsten Buhlmann, Baruth (DE)

(73) Assignee: Akzenta Paneele + Profile GMBH, Kaisersesch (DE)

( * ) Notice: Subject to any disclaimer, the term of this patent is extended or adjusted under 35 U.S.C. 154(b) by 18 days.

(21) Appl. No.: 18/950,446

(22) Filed: Nov. 18, 2024

(65) Prior Publication Data

US 2025/0073748 A1 Mar. 6, 2025

Related U.S. Application Data

(62) Division of application No. 17/626,213, filed as application No. PCT/EP2020/069129 on Jul. 7, 2020, now Pat. No. 12,179,233.

(30) Foreign Application Priority Data

Jul. 17, 2019 (EP) .................................... 19186795

(51) Int. Cl.
*B05D 7/26* (2006.01)
*B05D 3/02* (2006.01)
(Continued)

(52) U.S. Cl.
CPC .................. *B05D 7/26* (2013.01); *B32B 3/30* (2013.01); *B32B 7/12* (2013.01); *B32B 27/06* (2013.01);
(Continued)

(58) Field of Classification Search
None
See application file for complete search history.

(56) References Cited

U.S. PATENT DOCUMENTS 4,125,678 A * 11/1978 Stvan .................. C08G 63/685 522/167
6,555,177 B1 4/2003 Magnusson et al.
(Continued)

FOREIGN PATENT DOCUMENTS

CN 104441894 A 3/2015
CN 106696578 A 5/2017
(Continued)

OTHER PUBLICATIONS

Anonymous, "Maserung—Wikipedia", Feb. 13, 2019 (Feb. 13, 2019), pp. 1-2, Retrieved from the Internet: https://de.wikipedia.org/wiki/Maserung [retrieved on Jan. 27, 2020], XP055662334, the whole document.

(Continued)

*Primary Examiner* — Alexander M Weddle
(74) *Attorney, Agent, or Firm* — Harness, Dickey & Pierce, P.L.C.

(57) ABSTRACT

The present disclosure relates to a panel comprising a structured lacquer surface, having a base panel, a melamine resin layer, an adhesion promoter layer and a lacquer-containing top coat, the melamine resin layer being provided on a surface of the base layer, the adhesion promoter layer being provided on the melamine resin layer and the lacquer-containing top coat being provided on the adhesion promoter
(Continued)

layer, the lacquer-containing top coat being structured. The disclosure also relates to a method for producing a panel of this type with a structured lacquer surface.

12 Claims, 1 Drawing Sheet

(51) Int. Cl.

| | |
|---|---|
| ***B05D 3/06*** | (2006.01) |
| ***B05D 3/12*** | (2006.01) |
| ***B05D 7/00*** | (2006.01) |
| ***B27N 7/00*** | (2006.01) |
| ***B32B 3/30*** | (2006.01) |
| ***B32B 7/12*** | (2006.01) |
| ***B32B 27/06*** | (2006.01) |
| ***B32B 27/42*** | (2006.01) |
| ***B32B 29/00*** | (2006.01) |
| ***B41F 23/08*** | (2006.01) |
| ***B44C 3/02*** | (2006.01) |
| ***B44C 5/04*** | (2006.01) |

(52) U.S. Cl.

CPC ............ *B32B 27/42* (2013.01); *B32B 29/002* (2013.01); *B41F 23/08* (2013.01); *B44C 3/02* (2013.01); *B44C 5/04* (2013.01); *B05D 3/0263* (2013.01); *B05D 3/067* (2013.01); *B05D 3/12* (2013.01); *B05D 7/574* (2013.01); *B05D 7/576* (2013.01); *B27N 7/005* (2013.01); *B32B 2255/10* (2013.01); *B32B 2255/26* (2013.01); *B32B 2255/28* (2013.01); *B32B 2451/00* (2013.01); *B32B 2607/00* (2013.01)

(56) References Cited

U.S. PATENT DOCUMENTS

| | | | | |
|---|---|---|---|---|
| 8,801,887 | B2 | 8/2014 | Wimer et al. | |
| 2011/0117340 | A1 | 5/2011 | Oldorff | |
| 2012/0213973 | A1* | 8/2012 | Clement | B44C 5/04 428/161 |
| 2014/0017452 | A1 | 1/2014 | Pervan et al. | |
| 2016/0207064 | A1 | 7/2016 | Kuhn et al. | |
| 2018/0363304 | A1 | 12/2018 | Hannig | |

FOREIGN PATENT DOCUMENTS

| | | | |
|---|---|---|---|
| CN | 107206762 | A | 9/2017 |
| CN | 108367561 | A | 8/2018 |
| EP | 1454763 | A2 | 9/2004 |
| EP | 2236313 | A1 | 10/2010 |
| EP | 2700508 | A1 | 2/2014 |
| EP | 3278982 | A1 | 2/2018 |
| EP | 3626478 | A1 | 3/2020 |

OTHER PUBLICATIONS

International Search Report (English and German) and Written Opinion of the ISA (German) issued in PCT/EP2020/069129; ISA/EP.

Chinese Office Action regarding Application No. 2020800488502, dated Jun. 3, 2023.

* cited by examiner

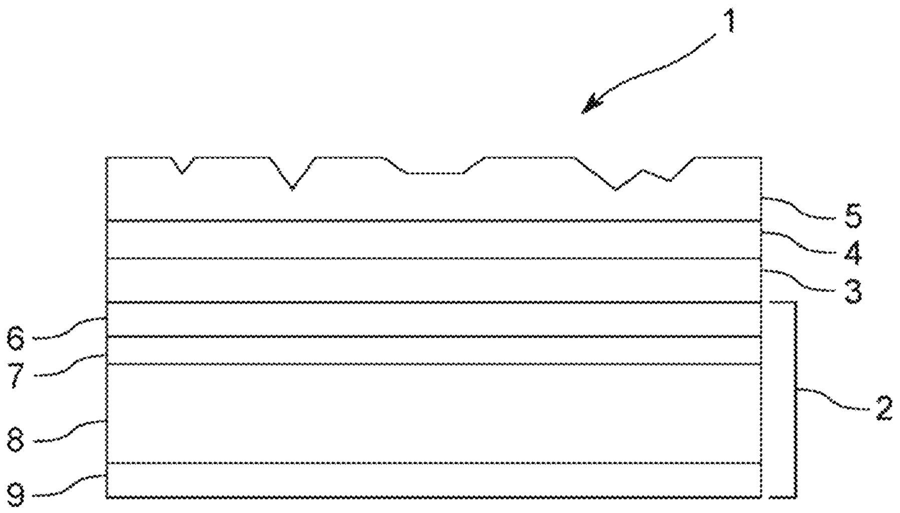
1
5
4
3
6
7
8
9
2

PANELS COMPRISING A STRUCTURED LACQUER SURFACE

CROSS-REFERENCE TO RELATED APPLICATIONS

This application is a divisional of U.S. patent application Ser. No. 17/626,213, filed Jan. 11, 2022, which is a U.S. National Phase Application under 35 U.S.C. 371 of International Application No. PCT/EP2020/069129, filed on Jul. 7, 2020, which claims the benefit of European Patent Application No. 19186795.1, filed on Jul. 17, 2019. The entire disclosures of the above applications are incorporated herein by reference.

FIELD

The present disclosure relates to panels comprising a structured lacquer surface and a method for producing panels comprising a structured lacquer surface.

BACKGROUND

This section provides background information related to the present disclosure which is not necessarily prior art.

Panels comprising a structured lacquer surface are known per se and are used in particular in decorative panels to improve the haptic properties, increase the value and provide wear protection.

In the sense of the present disclosure, the term decorative panel is understood to mean wall, ceiling, door or floor panels which comprise a decoration applied onto a carrier plate. Decorative panels are used in a variety of ways, both in the field of interior design of rooms and as decorative cladding of buildings, for example in exhibition stand construction. One of the most common fields of application of decorative panels is their use as a floor covering, for cladding ceilings, walls and doors. The decorative panels often have a decoration and a surface structure that is intended to imitate a natural material.

Examples of such imitated natural materials include wood species such as maple, oak, birch, cherry, ash, walnut, chestnut, wenge or even exotic woods such as panga-panga, mahogany, bamboo and bubinga. In addition, in many cases natural materials such as stone surfaces or ceramic surfaces are replicated.

Heretofore, such decorative panels have often been produced as laminates in which a decorative paper preprinted with a desired decoration is applied onto a carrier plate and in turn a so-called overlay is applied onto the decorative paper. After optionally a backing paper has been applied to the side of the carrier plate opposite to the decorative paper the laminate structure obtained is fixedly bonded together by use of appropriate pressure- and/or heat-activated adhesives.

For protecting the panel and, in particular, the decorative layer that may have been applied, wear layers or top coats are generally applied to the panel, which are often based on melamine resin. In many cases, it is intended that a surface structure imitating a decoration template is introduced into such wear layers or top coats, so that the surface of the decorative panel has a haptically perceptible structure, which is adapted in its shape and pattern to the applied decoration, in order to achieve a reproduction of a natural material as close to the original as possible even with respect to the haptic.

In forming structured wear protection coats with lacquers, the structure is frequently introduced directly into the applied lacquer layer by means of embossing tools. A disadvantage of this type of process can be that, in particular forming small and locally limited structures, such as pores, is only possible with difficulty. In addition, the precise alignment of the embossing tools relative to the decoration can cause problems. In addition, variations of the structure can only be realized with great effort and, for example, small production series are comparatively uneconomical, because embossing tools have to be manufactured and replaced for each series.

Panels with individualized, high-quality and/or structure adapted to the decoration are therefore produced by use of special processes that may require considerable process adaptation and are therefore not suitable for comparable production volumes.

For this reason, panels often have no structure or only simple structures that are not individualized or adapted to the decoration. Particularly simple panels comprise, for example, only an unstructured melamine layer as a surface.

Structured surfaces of panels and their manufacture can therefore still offer potential for improvement.

SUMMARY

This section provides a general summary of the disclosure, and is not a comprehensive disclosure of its full scope or all of its features.

It is therefore the object of the present disclosure to provide panels comprising a structured lacquer surface which at least partially overcome the problems known from the prior art.

The disclosure proposes a panel comprising a structured lacquer surface. The panel comprises a base panel, a melamine resin layer, an adhesion promoter layer and a lacquer-containing top coat, wherein the melamine resin layer is disposed on a surface of the base panel, the adhesion promoter layer is disposed on the melamine resin layer and the lacquer-containing top coat is disposed on the adhesion promoter layer, wherein the lacquer-containing top coat comprises a structure.

It has been shown in a surprising manner that, by means of the adhesion promoter layer, panels comprising a melamine resin layer can also be subsequently provided with a structured lacquer surface. Compared to known panels comprising structured lacquer surfaces, the panels according to the disclosure are easier to manufacture, because the structuring process can be carried out downstream of an existing process of simple panels comprising a melamine resin layer, without having to change the process. Compared with panels that are easy to manufacture, the panels according to the disclosure can be provided with a more precise and individual structure, since other structuring methods can be used.

It is also possible to first structure the melamine resin layer in a usual way and then apply an adhesion promoter layer and a lacquer-containing top coat, wherein the lacquer-containing top coat assumes the structure of the melamine resin layer and thus makes it haptically perceivable.

In the sense of the disclosure, the term "base panel" means a panel which may not yet comprise a wear layer and/or a top coat. It is to be understood that the base panel comprises at least one carrier, wherein a "carrier" can be understood in particular as a layer serving as a core or as a base layer in a finished panel, which in particular comprises a natural material, such as a wood-based material, a fiber material, or a material comprising plastic. For example, the carrier may provide or contribute to an appropriate stability for a panel.

Wood-based materials in the sense of the disclosure in addition to solid wood materials are materials such as cross-laminated timber, glue-laminated timber, blockboard, veneered plywood, laminated veneer lumber, parallel strand lumber and bending plywood. In addition, wood-based materials in the sense of the disclosure are also chipboards such as pressboards, extruded boards, oriented structural boards (OSB) and laminated strand lumber as well as wood fiber materials such as wood fiber insulation boards (HFD), medium hard and hard fiberboards (MB, HFH) and in particular medium density fiberboards (MDF) and high density fiberboards (HDF). Even modern wood-based materials such as wood polymer materials (wood plastic composite, WPC), sandwich boards made of a lightweight core material such as foam, rigid foam or honeycomb paper and a layer of wood applied thereto, and minerally hardened, for example with cement, chipboards are wood-based materials in the sense of the disclosure. Moreover, cork represents a wood-based material in the sense of the disclosure.

Plastic materials which can be used for producing corresponding base panels or carriers are, for example, thermoplastic plastic materials such as polyvinyl chloride, polyolefines (such as polyethylene (PE), polypropylene (PP)), polyamides (PA), polyurethanes (PU), polystyrene (PS), acrylonitrile butadiene styrene (ABS), polymethyl methacrylate (PMMA), polycarbonate (PC), polyethylene terephthalate (PET), polyether ether ketone (PEEK) or mixtures or co-polymerizates thereof. The plastic materials can include common fillers, such as calcium carbonate (chalk), aluminum oxide, silicagel, quartz powder, wood flour, gypsum. In addition, they can be coloured in a known way.

The carrier can in particular be a web-like carrier or plate-like carrier. A "web-like carrier" can be understood as a carrier which, for example, has a web-like length in its manufacturing process and is therefore significantly longer compared to its thickness or width and whose length can be, for example, greater than 15 meters.

In the sense of the present disclosure, a "plate-shaped carrier" can further be understood as a carrier which is formed by separation from the web-like carrier and is formed in the shape of a plate. Moreover, the plate-shaped carrier may already define the shape and/or size of the panel to be produced. However, the plate-shaped carrier can also be provided as a large plate. A large plate in the sense of the disclosure is in particular a carrier whose dimensions several times exceed the dimensions of the final decorative panels, and which in the course of the manufacturing process is separated in a corresponding plurality of decorative panels, for example by sawing, laser or water jet cutting. For example, the large plate can correspond to the web-shaped carrier.

In the sense of the present disclosure, the term "melamine resin layer" is understood to mean a layer comprising a melamine resin, preferably consisting essentially of a melamine resin.

In the sense of the present disclosure the term "adhesion promoter layer" is understood to mean a layer comprising an adhesion promoter. In this context, the term "adhesion promoter" is understood to mean compositions suitable for creating a better bond between two materials.

In the sense of the present disclosure, the term "lacquer-containing top coat" is to be understood as a layer comprising a top lacquer, preferably consisting essentially of a top lacquer.

Accordingly, a panel described above may in particular have better manufacturability and/or a higher quality or more individualized structuring.

In detail, the panel according to the disclosure comprises a base panel which comprises a melamine resin layer on one surface. For example, the base panel comprising a melamine resin layer may be a common laminate comprising a melamine resin coating. In particular, the base panel comprising a melamine resin layer can be a semi-finished product but also a finished panel.

In this case, the melamine resin layer can also be structured, so that the resulting semi-finished product comprises a structured melamine resin layer. The panel also comprises an adhesion promoter layer on the melamine resin layer and a lacquer-containing top coat disposed on the adhesion promoter layer. The adhesion promoter layer mediates the adhesion between the melamine resin layer and the lacquer-containing top coat.

Thus, the advantages described above can be obtained, namely that panels comprising a melamine resin layer can also be subsequently provided with a structured lacquer surface and the panels are easier to manufacture than known panels comprising structured lacquer surfaces and can be provided with a more precise and individual structure than panels that are easy to manufacture.

The melamine resin layer may comprise a fully cured melamine resin. Alternatively, the melamine resin layer may also comprise partially cured melamine resin. Melamine resin in this context means the condensation product of melamine and formaldehyde. This also includes modified melamine resins. For example, the melamine resin layer may comprise urea-modified melamine resin, i.e. the condensation product of melamine, urea and formaldehyde.

In a preferred embodiment of the disclosure it may be provided that the base panel comprises a decorative layer comprising a decoration and the melamine resin layer is disposed on the decorative layer.

Furthermore, it can be provided that the melamine resin layer is structured, preferably synchronously with the decoration of the decorative layer, in order to allow a haptic perception of the decoration.

In this way, the panel comprising a structured lacquer surface can convey a decorative impression.

For example, a decoration can be applied onto the carrier, such as by a printing process. Furthermore, a suitable printing subsurface may be provided on the carrier. Alternatively, it is not excluded in the sense of the present disclosure that the decoration is applied in such a way that, for example, an already printed fiber layer, such as a paper layer, or also an already printed film, such as made of polyethylene, polypropylene or polyvinyl chloride, is applied onto the carrier.

In the sense of the present disclosure the term fiber materials means materials such as paper and nonwoven fabrics on the basis of plant, animal, mineral or even synthetic fibers as well as cardboards. Examples of fiber materials on the basis of plant fibers in addition to papers and nonwoven fabrics made of cellulose fibers are boards made of biomass such as straw, maize straw, bamboo, leaves, algae extracts, hemp, cotton or oil palm fibers. Examples of animal fiber materials are keratin-based materials such as wool or horsehair. Examples of mineral fiber materials are mineral wool or glass wool.

In a preferred embodiment of the disclosure it may be provided that the structure of the lacquer-containing top coat is synchronous with the decoration of the decorative layer, at least in partial areas.

In this way, it can be achieved that the panel comprising a structured lacquer surface conveys a particularly realistic decorative impression. In particular, the structuring, which is synchronous at least in partial areas, can result in that the haptic impression of the panel matches with the visual impression of the decoration.

In a preferred embodiment of the disclosure it may be provided that the base panel comprises edges adjacent to the surface and the lacquer-containing top coat is additionally arranged on the edges.

This means that the lacquer-containing top coat may also be arranged beyond the areas of the base panel covered by the melamine resin layer. Accordingly, the lacquer-containing top coat may be partially arranged directly on the base panel.

In this way, it can be achieved that the panel is also protected at edges by the lacquer-containing top coat. For example, simply manufactured laminates comprising a melamine resin layer can thus be protected at the cutting edges by the lacquer-containing top coat after separation.

In a preferred embodiment of the disclosure it may be provided that the adhesion promoter layer comprises a cured acid-curable and/or radiation-curable adhesion promoter composition.

In a preferred embodiment of the disclosure it may be provided that the adhesion promoter layer comprises a cured aminoplast as adhesion promoter composition, preferably a urea resin. a melamine resin and/or a melamine urea resin.

In this way, it can be achieved that the adhesion promoter layer adheres particularly well to the melamine resin layer. Adhesion of the adhesion promoter layer based on aminoplasts to the lacquer-containing top coat can be achieved in particular in that the adhesion promoter layer does not yet have to be fully cured before application of the lacquer-containing top coat.

In a preferred embodiment of the disclosure it may be provided that the adhesion promoter layer comprises a cured acrylate-based adhesion promoter composition, in particular a polyurethane-modified acrylate-based adhesion promoter composition.

In this way, it can be achieved that the adhesion promoter layer adheres particularly well to the melamine resin layer and, at the same time, the lacquer-containing top coat adheres particularly well to the adhesion promoter layer. Acrylic-based adhesion promoter compositions are also easy to cure and can be applied uniformly. In addition, by means of the proposed adhesion promoter compositions it can be achieved that a visual impression of the decoration is not too strongly affected by the different layers.

In a preferred embodiment of the disclosure it may be provided that the adhesion promoter composition comprises dipentaerythritol acrylate and ethoxylated trimethylpropane triacrylate, preferably in a mass ratio of 1:2 to 3:1.

In a preferred embodiment of the disclosure it may be provided that the adhesion promoter composition comprises dipentaerythritol acrylate in an amount of greater than or equal to 1 wt.-% to less than or equal to 3 wt.-%, based on the adhesion promoter composition.

In a preferred embodiment of the disclosure it may be provided that the adhesion promoter composition comprises ethoxylated trimethylpropane triacrylate in an amount of greater than or equal to 1 wt.-% to less than or equal to 2 wt.-%, based on the adhesion promoter composition.

In this case, the adhesion promoter composition preferably comprises polyurethane-modified acrylate as the main constituent.

This makes it possible to achieve a particularly good crosslinking in the adhesion promoter layer. In addition, a particularly good crosslinking of the adhesion promoter composition with the melamine resin of the melamine resin layer and of the top lacquer with the adhesion promoter composition can be achieved. In this way, it can be achieved that the panel exhibits a particularly strong bond between the various layers, as a result of which the panel exhibits improved wear protection.

In a preferred embodiment of the disclosure it can be provided that the adhesion promoter composition additionally comprises water and optionally 2-butoxyethanol, 4-ethylmorpholine, 1,2-benzisothiazol-3(2H)-one, zinc pyrithione and/or reaction mass of 5-chloro-2-methyl-4-isothiazolin-3-one and 2-methyl-2H-isothiazol-3-one.

In a preferred embodiment of the disclosure it may be provided that the adhesion promoter composition comprises 2-butoxyethanol in an amount of greater than or equal to 1 wt.-% to less than or equal to 3 wt.-%, based on the adhesion promoter composition.

In a preferred embodiment of the disclosure it may be provided that the adhesion promoter composition comprises 4-ethylmorpholine in an amount of greater than or equal to 0.1 wt.-% to less than or equal to 1 wt.-%, based on the adhesion promoter composition.

In a preferred embodiment of the disclosure it may be provided that the adhesion promoter composition comprises 1,2-benzisothiazol-3(2H)-one in an amount of greater than 0 wt.-% to less than or equal to 0.05 wt.-%, based on the adhesion promoter composition.

In a preferred embodiment of the disclosure it may be provided that the adhesion promoter composition comprises zinc pyrithione in an amount of greater than or equal to 0.001 wt.-% to less than or equal to 0.01 wt.-%, based on the adhesion promoter composition.

In a preferred embodiment of the disclosure it may be provided that the adhesion promoter composition comprises reaction mass of 5-chloro-2-methyl-4-isothiazolin-3-one and 2-methyl-2H-isothiazol-3-one in an amount of greater than or equal to 0 wt.-% to less than or equal to 0.0015 wt.-%, based on the adhesion promoter composition.

Advantageously, this enables the adhesion promoter composition to be applied particularly uniformly and the panel thus comprises a particularly uniform adhesion promoter layer.

In a particularly preferred embodiment of the disclosure it may be provided that the adhesion promoter composition comprises 2-butoxyethanol, 4-ethylmorpholine, 1,2-benzisothiazol-3(2H)-one, zinc pyrithione, 5-chloro-2-methyl-4-isothiazolin-3-one and 2-methyl-2H-isothiazol-3-one, each preferably in the amounts described above.

In a preferred embodiment of the disclosure it may be provided that the lacquer-containing top coat comprises a cured top lacquer, in particular a cured radiation-curable top lacquer.

Cured radiation-curable top lacquers exhibit particularly well wear protection properties and can exhibit particularly good haptic and/or optical properties. In addition, radiation-curable top lacquers enable to produce the structuring of the lacquer-containing top coat in a particularly easy manner.

In a preferred embodiment of the disclosure it can be provided that the lacquer-containing top coat comprises a cured acrylate-based top lacquer, in particular a cured polyurethane-modified acrylate-based top lacquer.

In a preferred embodiment of the disclosure it may be provided that the lacquer-containing top coat comprises hard materials, preferably in an amount between 5 wt.-% and 40 wt.-%, wherein the hard materials preferably have an average grain diameter between 10 μm and 250 μm.

In the sense of the disclosure the term "hard materials" is understood to mean materials which have a sufficient hardness. For example, the hard materials can have a Mohs hardness of at least ≥8, preferably at least ≥9. Examples of suitable hard materials are titanium nitride, titanium carbide, silicon nitride, silicon carbide, boron carbide, tungsten carbide, tantalum carbide, aluminum oxide (corundum), zirconium oxide, zirconium nitride or mixtures thereof.

Thus, it is enabled advantageously that the structured lacquer-containing top coat can be particularly abrasion-resistant. Hard materials in the lacquer-containing top coat enable an abrasion protection of the structure after curing of the lacquer-containing top coat. Thus, it is enabled that the structure becomes less blunt due to stress.

In a further embodiment of the disclosure it can be provided that the lacquer-containing top coat has a thickness from ≥1 μm to ≤5 mm, preferably from ≥1 μm to ≤200 μm, in particular from ≥1 μm to ≤20 μm.

In this way, it is advantageously achieved that the lacquer-containing top coat can have a sufficiently deep structure so that a particularly good haptic impression can be achieved. In addition, it is advantageously achieved that the curing of the top coat can take place sufficiently quickly so that the structure is not altered by any deliquescence of the top coat.

The disclosure also proposes a method for producing a panel comprising a structured lacquer surface.

In detail, a method is provided, comprising at least the following method steps:

a. providing a base panel comprising a melamine resin layer disposed on a surface of the base panel,
b. forming an adhesion promoter layer on the melamine resin layer based on an adhesion promoter composition,
c. forming a lacquer-containing top coat on the adhesion promoter layer on the basis of a top lacquer, wherein the base panel, the adhesion promoter composition and the top lacquer are designed as described above, and wherein the formation of the lacquer-containing top coat involves structuring and curing of the top lacquer, or wherein the base panel, the adhesion promoter composition and the top lacquer are designed as described above, and wherein the melamine resin layer has been structured and the method comprises forming the lacquer-containing top coat and curing the top lacquer in such a manner that the structuring of the melamine resin layer is perceptible on the cured top lacquer layer.

Surprisingly, it has been shown that such a method permits a particularly simple production of panels comprising a structured lacquer surface, since a simple panel comprising a melamine resin layer can be used as the base panel, as it is produced in very large quantities. Consequently, in order to achieve a structuring of the panel, the established process does not have to be extensively modified, but the structuring can take place subsequently or is carried out as part of the formation of the melamine resin layer.

In the sense of the disclosure, the term "curing" is to be understood to mean that a formable material loses its formability. For example, a liquid formable material may be solidified. A plastically deformable solid can for example be transformed into an elastically deformable solid by curing. Here, during at least partial curing, the material may partially lose its formability, i.e. it may lose its formability at certain points, for example at the surface. It can also be understood to mean that the formability is only reduced and the material does not become completely unformable. It may also be understood to mean complete hardening.

In a preferred embodiment of the disclosure it may be provided that forming of the adhesion promoter layer comprises applying the adhesion promoter composition onto the melamine resin layer and drying the adhesion promoter composition on the melamine resin layer.

By applying the adhesion promoter composition onto the melamine resin layer, it is possible that the adhesion promoter composition can compensate for unevennesses of the melamine resin layer when forming the adhesion promoter layer. In addition, it can be achieved that the adhesion promoter layer is formed over the entire area of the melamine resin layer, so that a uniform adhesion can be achieved. By drying the adhesion promoter composition it can be achieved, that solvent can be removed from the melamine resin layer prior to curing of the adhesion promoter composition. Thus, it can be achieved that the adhesion promoter composition can comprise solvents when applied. Solvents can be used to adjust the application properties of the adhesion promoter composition.

In one embodiment of the disclosure it can be provided that the application of the adhesion promoter composition onto the melamine resin layer comprises a rolling process.

By rolling, it can advantageously be achieved that the adhesion promoter composition can be distributed particularly uniformly. In addition, it can be achieved that the formed adhesion promoter layer is particularly thin. Thus, in particular the visual impression of the panel is particularly little impaired and, at the same time, a sufficiently good adhesion between the melamine resin layer and the lacquer-containing top coat is achieved.

In a preferred embodiment of the disclosure it can be provided that the adhesion promoter composition is dried during the rolling process.

This may ensure that after rolling the adhesion promoter composition remains well distributed.

In a preferred embodiment of the disclosure it may be provided that forming the adhesion promoter layer comprises curing the adhesion promoter composition, preferably by means of electromagnetic radiation and/or thermal curing.

By means of curing it can be achieved that the adhesion promoter composition reacts and in particular already bonds with the melamine resin layer. At the same time, however, it can be achieved that the formed adhesion promoter layer continues to adhere sufficiently to the lacquer-containing top coat.

In a preferred embodiment of the disclosure it may be provided that the adhesion promoter composition is cured by electromagnetic radiation, in particular by UV radiation and/or IR radiation, preferably with a wavelength in a range from ≥10 nm to ≤450 nm.

In this way, advantageously a particularly fast and uniform curing is achieved.

In one embodiment of the disclosure it may be provided that the top lacquer comprises a plastic composition, preferably an acrylate-based plastic composition, in particular a polyurethane-modified acrylate plastic composition. It is to be understood that in this case the top lacquer comprises the plastic composition in a still uncured form, so that a structuring of the top coat is possible.

This advantageously ensures that the lacquer-containing top coat has particularly good protective properties, such as stability, scratch resistance, heat resistance, water resistance and the like.

In a preferred embodiment of the disclosure, the plastic composition may comprise a dipropylene glycol diacrylate, preferably in an amount of >0 to ≤15 wt.-%, based on the plastic composition, and a reaction product of pentaerythritol, epichlorohydrin and acrylic acid, preferably in an amount of ≥2 to ≤15 wt.-%, based on the plastic composition.

In a preferred embodiment of the disclosure, the plastic composition may additionally comprise a catalyst, preferably in an amount from ≥1 to ≤10 wt.-%, based on the plastic composition. Preferably, the catalyst may be a tertiary ammonium salt, in particular a tertiary ammonium salt selected from the group consisting of tetrabutlyammonium bromide, methyltrioctylammonium chloride, benzyltriethylammonium chloride, hexadecyltrimethylammonium bromide and mixtures thereof. In a particularly preferred embodiment of the disclosure the catalyst may be tetrabutlyammonium bromide.

In a preferred embodiment of the disclosure, the plastic composition may additionally comprise a photoinitiator, preferably in an amount of ≥0.1 to ≤2 wt.-%, based on the plastic composition.

In a preferred embodiment of the disclosure, the photoinitiator may be a phosphine oxide, preferably an aromatic phosphine oxide, in particular phenyl-bis(2,4,6-trimethylbenzoyl)-phosphine oxide.

In a further embodiment of the disclosure it may be provided that the lacquer-containing top coat has a thickness from ≥1 μm to ≤5 mm, preferably from ≥10 μm to ≤200 μm, in particular from ≥50 μm to ≤60 μm. Here, it may be provided that the lacquer-containing top coat is applied onto the adhesion promoter layer in an application amount from ≥50 $g/m^2$ to ≤100 $g/m^2$, preferably from ≥60 $g/m^2$ to ≤80 $g/m^2$, for example 70 $g/m^2$.

In one embodiment of the disclosure it may be provided that the lacquer-containing top coat comprises a material curable by electromagnetic radiation, in particular a material curable by UV radiation and/or IR radiation.

This enables in an advantageous manner that the curing can take place in a particularly quick and locally targeted manner. According to the disclosure, a material curable by electromagnetic radiation is understood as a material in which a chemical reaction can be initiated by electromagnetic radiation, whereby the material becomes harder.

For example, this chemical reaction may be a polymerization or a crosslinking reaction.

In one embodiment of the disclosure it may be provided that the structuring of the lacquer-containing top coat is carried out after at least partial curing by embossing the structure. For example, the structure may be impressed by use of a short-cycle press or a belt press.

Advantageously, this can make the structuring of the lacquer-containing top coat particularly quick and cost-efficient.

Likewise, the melamine resin layer can be structured by means of suitable structuring means such as structured press plates or belts in a short-cycle press or a belt press. The formation of the lacquer-containing top coat and the curing of the top lacquer can then be implemented in such a way that the structuring of the melamine resin layer on the cured top lacquer layer is perceivable. The top lacquer layer thus follows the structure of the structured melamine resin layer underlying it and underlying the adhesion promoter layer.

In one embodiment of the disclosure it can be provided that the structuring of the lacquer-containing top coat is carried out by means of a digital printing process by spraying on a displacement ink by use of an inkjet process.

According to the disclosure, the term "spraying on" is understood to mean that a material is applied as an aerosol jet onto a subsurface in the form of particles and/or drops. The term "displacement ink" is understood according to the disclosure to mean an ink, for example a liquid, a solution or a suspension, which when impinging on a formable material partially displaces it. The term "ink-jet process" is understood according to the disclosure to mean a process in which an ink is applied in a matrix via one or more nozzles.

Thus, it is advantageously achieved that the lacquer-containing top coat is structured by the impact of the displacement ink. At those points where the ink impinges, the impact of a drop or particle can create depressions such as craters or valleys, at the bottom of which the ink remains. In addition, the displacement during the formation of the depression can cause a wall to form around the depression, which represents an elevation.

In one embodiment of the disclosure it may be provided that the displacement ink consists essentially of an ink composition selected from the group consisting of acrylic-based plastic, polyurethane-modified acrylic plastic, water, organic solvent, or mixtures thereof.

Thus, it can advantageously be achieved, that the displacement ink can on the one hand be sprayed well and on the other hand has good displacement properties.

In a preferred embodiment of the disclosure it may be provided that the ink composition comprises an ethoxyethyl acrylate, preferably 2-(2-ethoxyethoxy)ethylene acrylate, preferably in an amount from ≥20 to ≤40 wt.-%, based on the ink composition. In addition, it may be provided that the ink composition comprises an ethoxylated polyol esterified with acrylic acid, preferably 1,1,1-trimethylol propanethoxylate triacrylate, preferably in an amount from ≥20 to ≤40 wt.-%, based on the ink composition. Additionally, it may be provided that the ink composition comprises a urethane acrylate, preferably in an amount from ≥10 to ≤20 wt.-%, based on the ink composition. Additionally, it may be provided that the ink composition comprises pentaerythritol acrylic acid ester, preferably in an amount from ≥5 to ≤10 wt.-%, based on the ink composition. It may also be provided that the ink composition comprises amine-modified acrylic oligomers, in particular reaction products of tripropylene glycol diacrylate with diethylamine, preferably in an amount from ≥5 to ≤10 wt.-%, based on the ink composition.

In one embodiment of the disclosure it may be provided that the displacement ink is cured and crosslinked with the lacquer-containing top coat during curing of the lacquer-containing top coat.

Advantageously, this enables a particularly stable structuring to be produced as the displacement ink bonds with the lacquer-containing top coat.

In one embodiment of the disclosure it can be provided that the displacement ink is evaporated during curing of the lacquer-containing top coat.

In this way, it is advantageously achieved that particularly deep structures are provided, since the applied displacement ink is removed again from the depressions.

In one embodiment of the disclosure it can be provided that a drop speed, a drop volume and a position of the sprayed-on displacement ink are varied according to a three-dimensional digital template.

By varying and controlling the drop speed, it can advantageously be achieved that structures with different depths can be produced. It is also achieved that structures with different wall sharpnesses are produced. In particular, it is possible to vary whether the structure has sharp or blunt edges. By varying the drop volume, moreover, the depth of the structure can be varied.

In addition, in particular the width of depressions can be varied. By varying the position, it is adjusted where depressions and elevations are located. In this way, altogether a complete control over the structuring is achieved, so that a desired structure can be produced according to a three-dimensional digital template. In this context, the term “three-dimensional digital template” is understood to mean a template that reproduces a structure three-dimensionally, wherein the template can be present, for example, in the form of a CAD model stored on a digital medium.

In one embodiment of the disclosure it can be provided that the digital template is generated on the basis of a decoration, wherein the digital template provides complementary depressions and elevations corresponding to the haptic of the decoration.

In this way it is advantageously achieved that the haptic perception of the wear protection film matches with the visual perception of a decoration, so that, for example, a decorative panel makes a particularly high-quality overall impression.

In one embodiment of the disclosure it may be provided that the curing is carried out by use of UV radiation having a wavelength in a range from ≥10 nm to ≤450 nm, preferably from ≥200 nm to ≤410 nm.

In a further embodiment of the disclosure it may be provided that the curing is carried out in a first curing step by use of UV radiation in a range from ≥315 nm to ≤450 nm, preferably ≥380 nm to ≤410 nm, and in a second curing step by use of UV radiation in a range from ≥10 nm to ≤250 nm, preferably from ≥170 nm to ≤225 nm.

In this way, it can advantageously be achieved that the surface is cured to a particularly high degree. This also makes it possible to achieve a particularly high chemical resistance. In addition, it can be achieved that a good curing is achieved without photoinitiators or with only a small amount of photoinitiator. Furthermore, a curing can thereby be enabled with only a small amount of heat input.

In a further embodiment of the disclosure it can be provided in particular that the lacquer-containing top coat is cured in the second curing step by use of UV radiation from a radiation source with a power of ≥5 to ≤30 W/cm.

In this way it can advantageously be achieved that only a small amount of heat is introduced into the lacquer-containing top coat during curing. In this way, in addition, undesired deformations can be avoided and the lacquer-containing top coat can nevertheless be cured sufficiently well.

In one embodiment of the disclosure it can be provided that during curing, in particular in the second curing step, the volume between the UV radiation source and the lacquer-containing top coat comprises an inert gas atmosphere. This is understood to mean that an inert gas, for example $N_2$ or a noble gas, has substantially displaced the air in the region between the UV radiation source and the lacquer-containing top coat. In particular, this is understood to mean that essentially no oxygen is exposed to the direct UV radiation between the UV radiation source and the lacquer-containing top coat.

In this way, it can advantageously be achieved that a drying process can be carried out with particularly short wavelengths. Thus, it can be achieved that the UV radiation is absorbed comparatively less. In addition, it can be achieved that the UV radiation does not cause any reactions in the air, such as the reaction to ozone.

In addition, in this way undesirable surface reactions can be avoided, so that a particularly stable surface is obtained.

In one embodiment of the disclosure it can be provided that the curing starts less than 5 s, preferably less than 2 s, in particular less than 0.5 s after the structuring.

In this way, it is advantageously achieved that the structuring does not change due to subsequent deliquescence prior to curing.

In one embodiment of the disclosure it can be provided that the lacquer-containing top coat is pre-cured before structuring.

Thus. it is advantageously achieved that the viscosity of the lacquer-containing top coat can be adjusted. In this way, it can be achieved that the structure can be produced particularly detailed. This can also be understood to mean that a curing process is initiated shortly before structuring, so that during structuring the formed structures reach a hardness that is sufficient to prevent subsequent deliquescence before the final curing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The disclosure is further explained below with reference to the FIGURE. The FIGURE shows one possible embodiment of the disclosure. In principle, however, combinations or variations of the embodiment are possible within the scope of the disclosure.

FIG. 1 schematically shows the structure of a panel comprising a structured lacquer surface.

DETAILED DESCRIPTION

Example embodiments will now be described more fully with reference to the accompanying drawings.

In detail, FIG. 1 schematically shows the cross-section of a panel 1 comprising a structured lacquer surface. The panel comprises a base panel 2, a melamine resin layer 3, an adhesion promoter layer 4 and a lacquer-containing top coat 5, wherein the melamine resin layer 3 is disposed on one surface of the base panel 2, the adhesion promoter layer 4 is disposed on the melamine resin layer 3, and the lacquer-containing top coat 5 is disposed on the adhesion promoter layer 4, wherein the lacquer-containing top coat 5 is structured.

In this case, the base panel 2 of the shown embodiment comprises a decorative layer 6 including a decoration. Here, the melamine resin layer 3 is disposed on the decorative layer 6. In addition, the base panel 2 comprises a further melamine resin layer 7, a carrier plate 8 and a backing paper 9.

The panel 1 was produced by first applying a melamine resin layer 3 onto the decorative layer 6 of the base panel 2 comprising the decorative layer 6, the melamine resin layer 7, the carrier plate 8 and the backing paper 9. An adhesion promoter composition was rolled onto the base panel 2 produced in this way and comprising the melamine resin layer 3 disposed on the surface of the base panel 2 and then cured while forming the adhesion promoter layer 4.

Subsequently a top lacquer was applied onto the adhesion promoter layer 4, structured by means of a digital printing process and subsequently cured, wherein the structured lacquer-containing top coat 5 was formed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are inter-changeable and can be used in a selected embodiment, even if not specifically shown or described. The same may also be varied in many ways. Such variations are to be regarded as a departure from the disclosure, and all such modifications are intended to be included within the scope of the disclosure.

The invention claimed is:

1. A panel comprising a structured lacquer surface, including a base panel, a melamine resin layer, an adhesion promoter layer and a lacquer-containing top coat, wherein the melamine resin layer is disposed on a surface of the base panel, the adhesion promoter layer is disposed on the melamine resin layer and the lacquer-containing top coat is disposed on the adhesion promoter layer, wherein the lacquer-containing top coat comprises a structure.

2. The panel according to claim 1, wherein the base panel comprises a decorative layer comprising a decoration, and wherein the melamine resin layer is disposed on the decorative layer.

3. The panel according to claim 2, wherein the structure of the lacquer-containing top coat is synchronous with the decoration of the decorative layer at least in partial areas.

4. The panel according to claim 1, wherein the base panel comprises edges adjacent to the surface and the lacquer-containing top coat is additionally disposed on the edges.

5. The panel according to claim 1, wherein the adhesion promoter layer comprises a cured acid-curable and/or radiation-curable adhesion promoter composition.

6. The panel according to claim 5, wherein the adhesion promoter layer comprises a cured aminoplast as adhesion promoter composition, wherein said cured aminoplast is a urea resin, a melamine resin and/or a melamine urea resin.

7. The panel according to claim 5, wherein the adhesion promoter layer comprises a cured acrylate-based adhesion promoter composition or a polyurethane-modified acrylate-based adhesion promoter composition.

8. The panel according to claim 5, wherein the adhesion promoter composition comprises dipentaerythritol acrylate and ethoxylated trimethylolpropane triacrylate.

9. The panel according to claim 8, wherein the adhesion promoter composition comprises dipentaerythritol acrylate and ethoxylated trimethylolpropane triacrylate in a mass ratio of 1:2 to 3:1.

10. The panel according to claim 5, wherein the adhesion promoter composition prior to curing, additionally comprises water and at least one of 2-butoxyethanol, 4-ethylmorpholine, 1,2-benzisothiazol-3 (2H)-one, zinc pyrithione, or the reaction mass of 5-chloro-2-methyl-4-isothiazolin-3-one and 2-methyl-2H-isothiazol-3-one.

11. The panel according to claim 1, wherein the lacquer-containing top coat comprises a cured top lacquer.

12. The panel according to claim 1, wherein the lacquer-containing top coat comprises a cured acrylate-based top lacquer.

* * * * *